United States Patent [19]

Tikalsky

[11] Patent Number: 4,908,828
[45] Date of Patent: Mar. 13, 1990

[54] METHOD FOR ERROR FREE MESSAGE RECEPTION

[75] Inventor: Terry Tikalsky, Sunnyvale, Calif.

[73] Assignee: Indesys, Inc., Sunnyvale, Calif.

[21] Appl. No.: 138,852

[22] Filed: Dec. 29, 1987

[51] Int. Cl.[4] ............... G06F 11/10; G08C 25/00
[52] U.S. Cl. ................................. 371/69.1; 371/32
[58] Field of Search .............. 371/35, 69, 32, 69.1; 370/94

[56] References Cited

U.S. PATENT DOCUMENTS

| | | | |
|---|---|---|---|
| 3,602,891 | 8/1971 | Clark et al. | 364/900 |
| 3,732,541 | 5/1973 | Neubauer | 371/69 |
| 3,919,690 | 11/1975 | Field et al. | 371/69 |
| 4,138,735 | 2/1979 | Allocca et al. | 364/900 |
| 4,551,842 | 11/1985 | Segarra | 371/69 |
| 4,578,535 | 3/1986 | Simmons | 371/69 |
| 4,745,599 | 5/1988 | Raychauduri | 370/94 |
| 4,759,022 | 7/1988 | Akerberg | 371/69 |
| 4,764,928 | 8/1988 | Akerberg | 371/69 |
| 4,766,599 | 8/1988 | Miyazaki | 375/8 |

OTHER PUBLICATIONS

K. S. Shanmugam, *Digital and Analog Communication Systems*, 1979, John Wiley & Sons, Inc., pp. 493-497.

Primary Examiner—Charles E. Atkinson
Attorney, Agent, or Firm—Alfred A. Equitz

[57] ABSTRACT

A method for ensuring accurate reception of digitally encoded messages that are transmitted over a broadcast network to a plurality of receivers. Each message is divided into packets and the set of packets comprising each message is cyclically retransmitted for a selected number of transmission cycles. Typically, from two to five transmission cycles are sufficient to ensure accurate reception of each message. Each packet includes all or part of a digitally encoded message, a header, and a cyclic redundancy check (CRC) code (or other error code). Each header identifies the message to which the packet belongs and the position of the packet within the message. Each receiver in the network stores an address in an internal memory, and is capable of comparing a transmitted address (in the header of one or more of the packets in each message) with its stored address and accepting only those packets having an appropriate address. Each accepted packet is checked for errors using the transmitted error code (which preferably is a CRC code). If no errors are detected, the packet number of the packet is added to a list of correctly received packets for the message. If an error is detected, the packet number of the packet is not added to this list. Upon retransmission of the same message, the receiver checks the list against the header of each retransmitted packet of the message, and accepts only those packets which were not previously received without error. In a preferred embodiment, the messages are transmitted in the SCA band of an FM channel. Each receiver preferably includes an appropriately programmed computer in which the signal processing operations comprising the invention are performed in software.

16 Claims, 2 Drawing Sheets

METHOD FOR ERROR FREE MESSAGE RECEPTION

FIELD OF THE INVENTION

This invention relates to methods for transmitting messages over a broadcast network and for error free reception of the transmitted messages. More particularly, the invention relates to methods for transmitting messages to selected recipients over a broadcast network, and for error free reception of the transmitted messages by the selected recipients.

BACKGROUND OF THE INVENTION

In conventional methods for broadcast distribution of information, messages have been addressed to selected recipients distributed throughout a network by including a distribution list as part of a header which is transmitted with each message.

For example, U.S. Pat. No. 4,138,735, issued Feb. 6, 1979 to Allocca, et al., discloses a method for transmitting data blocks that will be accepted only by specifically addressed receiving stations. Each data block includes postal rate chart information, a receiving station address, a "rate revision number," and a "check sum" (or "check characters") used for verifying accurate reception and processing of the block. Each receiving station will process a block only after it verifies that an address transmitted as part of the block matches a preset address stored in the receiving station.

If the addresses match, the receiving station then checks whether the transmitted rate revision number is greater than a rate revision number stored in the receiving station. If not, the block is not accepted. On the other hand, if the transmitted revision number exceeds the stored revision number, the block is accepted and written into memory. After a block is written into a receiving station's memory, an error computation is performed (using the transmitted check sum or check characters) to determine whether the block has been accurately received and written into memory. If and only if the error computation indicates that the block has been accurately received and written into memory, a rate revision number in the receiving station is incremented.

Each block is cyclically retransmitted. A receiving station will not accept a retransmitted block if it has previously accepted a previous transmission of the same block, successfully performed an error computation on the previously accepted block, and incremented the above-described stored rate revision number upon successful performance of the error computation. If the previous error computation was not successfully performed, then the rate revision number stored within the receiving station will not have been incremented. Thus, if the previous error computation was not successfully performed, upon comparing the rate revision number in the retransmitted block with the unincremented rate revision number stored within the station, the station will accept the retransmitted block (and thereafter will perform another error computation, and so on).

However, the conventional method disclosed in U.S. Pat. No. 4,138,735 is inefficient where the transmitted blocks are lengthy (i.e. where each block includes much data). In this case, it is relatively likely that errors in transmission or in processing at the receiving station will occur, so that it is relatively likely that a lengthy message will need to be retransmitted many times before it is finally accurately received and processed.

In the United States, the carrier frequencies of FM radio stations are separated by 200 kHz, in accordance with Federal Communication Commission regulations. Conventional stereophonic FM radio signals that are broadcast over an FM channel typically occupy only a portion of the full 200 kHz band allocated to the channel (i.e., the frequency band within 53 kHz of the carrier frequency). The unused portion of the FM channel occupying the allocated band between 53 kHz and 100 kHz from the carrier frequency is known as the Subsidiary Communications Authorization (SCA) or the SCA band.

Methods and systems have been developed for transmitting FM signals (for example, the commercial-free music sometimes heard in restaurants and stores) in the SCA band of an FM channel. However, an efficient system for transmitting digitally encoded messages in the SCA band of an FM channel using conventional transmission technology must ensure accurate reception of the messages notwithstanding substantial and unpredictably varying noise inherent in broadcast transmission. Since each message retransmission is time-consuming and costly, it is desirable that an efficient system of this type will ensure accurate reception of each message with a minimum number of message retransmissions.

U.S. patent application Ser. No. 134,943, filed Dec. 18, 1987, now abandoned, by David C. Jenkins, which is assigned to the assignee of the present application, is of background relevance to the present application.

SUMMARY OF THE INVENTION

The invention is a method for ensuring accurate reception of digitally encoded messages that are transmitted over a broadcast network to a plurality of receivers. Each message is divided into packets (or "blocks"), and the set of packets comprising each message is cyclically retransmitted for a selected number of transmission cycles. Typically, from two to five transmission cycles are sufficient to ensure accurate reception of each message.

Each packet includes a portion of a digitally encoded message (or an entire digitally encoded message), a synchronization header, and an error code which is preferably a cyclic redundancy check (CRC) code. Each header includes a packet number which identifies the message to which the packet belongs and the position of the packet within the message. Each receiver in the network stores an address in an internal memory, and is capable of comparing a transmitted address (in the header of one or more of the packets comprising a message) with its stored address and accepting only those packets having an appropriate address.

Each accepted packet is checked for errors using the transmitted error code (which preferably is a CRC code). If no errors are detected, the packet number of the packet is added to a list of correctly received packets for the message. If an error is detected, the packet number of the packet is not added to this list. Upon retransmission of the same message, the receiver checks the list against the header of each retransmitted packet of the message, and accepts only those packets which were not previously received without error.

In a preferred embodiment, the messages are transmitted in the SCA band of an FM channel. Each receiver preferably includes an appropriately programmed computer in which the signal processing operations comprising the invention are performed in software. Each transmitter preferably includes an appropriately programmed computer so that the number of retransmission cycles for each message may be controlled by supplying appropriate instructions to the computer.

DETAILED DESCRIPTION OF THE PREFERRED EMBODIMENTS

Figure 1:
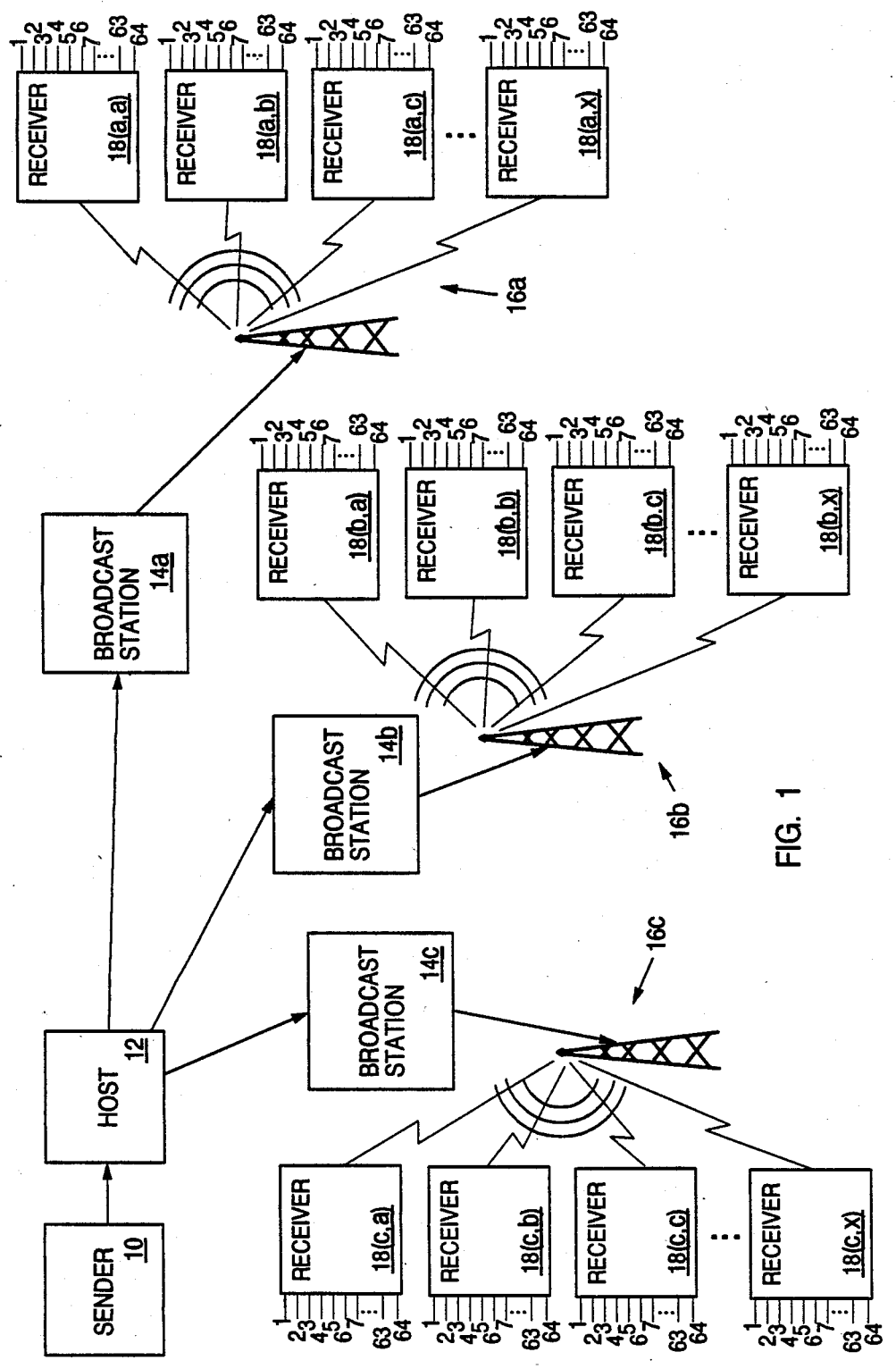
FIG. 1 is a block diagram of a network for broadcasting information which may be used to perform the invention.

FIG. 1 is a block diagram of a broadcast network which may be used to perform the present invention. Sender unit 10 is coupled to host unit 12. Host 12 is coupled to any number of broadcast stations 14. Three broadcast stations 14a, 14b and 14c are shown in FIG. 1. Each broadcast station is associated with a broadcast transmission medium 16. In FIG. 1, each broadcast medium means is denoted with an alphabetic suffix matching that for the broadcast station. Thus, broadcast medium 16a is associated with broadcast station 14a. A number of receivers 18 are associated with each broadcast station 14 and broadcast medium 16. Each broadcast station 14 can potentially transmit signals to any number of receivers 18. Each receiver is given a pair of alphabetic suffixes. The first element of the alphabetic suffix denotes the broadcast station with which the receiver is associated. The second element of the alphabetic suffix identifies the particular receivers for associated with a broadcast station. Thus, receiver 18(b,c) is a receiver coupled to receive a transmission from broadcast station 14b and it is the third (the c'th) such receiver. In a preferred embodiment, each of the receivers is capable of receiving messages for a finite number of separately addressable recipients. Each recipient is designated by a mail stop at that receiver.

To initiate the process of broadcasting a message to a receiver, sender 10 transmits the message to host unit 12. Host unit 12 operates on the message to determine the correct address for the message, and to add a header to each packet of the message for specifying the address. As will be discussed more fully below with reference to FIG. 2, the address preferably identifies the broadcast station (or stations) that should broadcast the message, and the receiver and mailstop to which the message is addressed. The host unit 12 then sends the message to the appropriate broadcast station (or stations) 14. Each such broadcast station 14 prepares the message for transmission within the broadcast medium 16 associated therewith. The receiver 18 identified by the address receives the message out of the broadcast medium 16.

In a preferred embodiment, sender unit 10 is a personal computer having a modem for data transmission to host unit 12. Sender unit 10 sends digitally encoded messages to host unit 12.

Host unit 12 preferably includes a link (such as a modem) which is coupled to receive each message from sender unit 10. The link is coupled to transfer each message it receives to a computer (which is a VAX computer in one preferred embodiment) within host unit 12. Host unit 12 preferably communicates with each broadcast station 14 using a modem over telephone lines. Each broadcast station 14 is preferably an FM broadcast radio station which includes a special purpose computer for transforming each message (each of which consists of digital information) received from host 12 into a broadcast signal for transmission by the FM radio station, preferably in a SCA sideband of the station's FM channel. The broadcast signal is transmitted from each station 14 via a broadcast medium 16 associated therewith.

In alternate embodiments, each broadcast station 14 and broadcast medium 16 could be comprised of a local area network server and local area network, a communications satellite and appropriate radio frequencies or other broadcast networks.

Each receiver 18 within the range of one of the broadcast stations receives the broadcast signal containing the message from the broadcast medium 16. The receiver 18 demodulates the signal, thus transforming it back into a binary, computer readable, stream of ones and zeros.

The broadcast network of the preferred embodiment may be used equally well for sending a message to one or many recipients. The sender concatenates a distribution list to the message. The distribution list may include a single name, a user number associated with that name, a list of names, a list of user numbers, or a list designator. The list designator might be "ABC Engineering Staff" and represent a list of all engineers within company ABC.

The message is transmitted to host unit 12 for appropriate processing. A recipient table and a receiver table are preferably stored in host unit 12. Each potential message recipient is assigned user number, a mail stop number, and a receiver number. The recipient table is a list for correlating each potential recipient with a user number, a receiver number, and a mail stop at the receiver. Each receiver 18 is assigned a private number and a broadcast station. The receiver table stored within host unit 12 is a list for correlating between the receiver number, the private number and the broadcast station to which that receiver is assigned.

When host unit 12 receives a message from sender 10, host unit 12 divides the message into one or more packets and affixes a header to each packet. Preferably the header is attached to the beginning of the packet. The header includes an address of the recipient.

Figure 2:
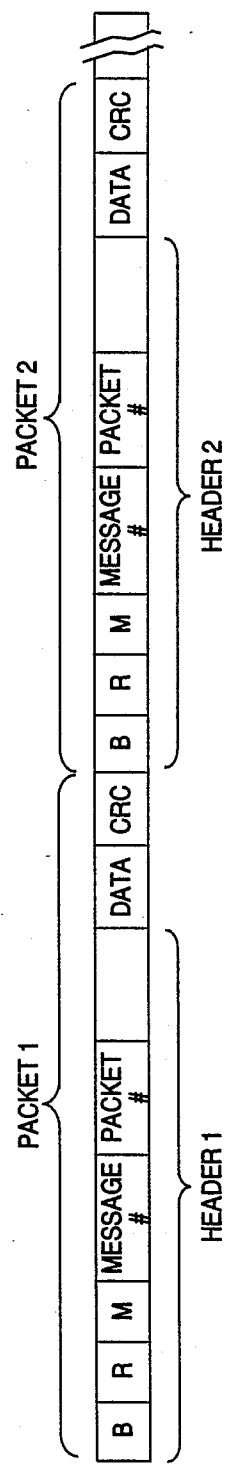
FIG. 2 is a diagram representing two packets of a message, of the type transmitted in accordance with the invention.

FIG. 2 is an example of two packets of a message in the format in which the packets emerge from host unit 12. The address portion of each packet includes a broadcast station code (B), a receiver code (R), and a mailstop code (M). The receiver code R may include the private number for the receiver. Also included in the header of each packet is a message number identifying the message of which the packet is a part, and a packet number. In FIG. 2, since both packets shown are different portions of a common message, each header will include the same message number. Each packet in FIG. 2 also includes a data portion including a portion of a digitally encoded message, and a CRC code. Although a CRC code is preferred, it is contemplated that other types of error codes could by substituted for each CRC code.

We prefer to use a CRC code, and more specifically, prefer to use a CRC code of the conventional type known as "CCIT CRC-16".

In the event that the sender 10 is transmitting a message to more than one recipient, host unit 12 affixes one header for each recipient to each packet of the message.

Each broadcast station 14 and its broadcast medium 16 cover a specific region. When commercial broadcast FM stations are used as the broadcast stations 14, the region covered by each station will generally be the geographic area within which the FM signal may be received. Host unit 12 will only send the message to those broadcast stations 14 covering the regions in which the intended recipients reside.

The broadcast station 14 transforms the message received from the host 12 from binary data into suitable signals for broadcast transmission. The message is transmitted over the broadcast medium 16 to all of the receivers 18a through 18x within the broadcast area for each broadcast station 14. Each receiver 18a through 18x within the broadcast area receives each message sent by the broadcast station 14 corresponding thereto. The packets comprising the message are appropriately demodulated within each receiver and the demodulated data is supplied to a computer (which may be a microprocessor) within each receiver.

Figure 3:
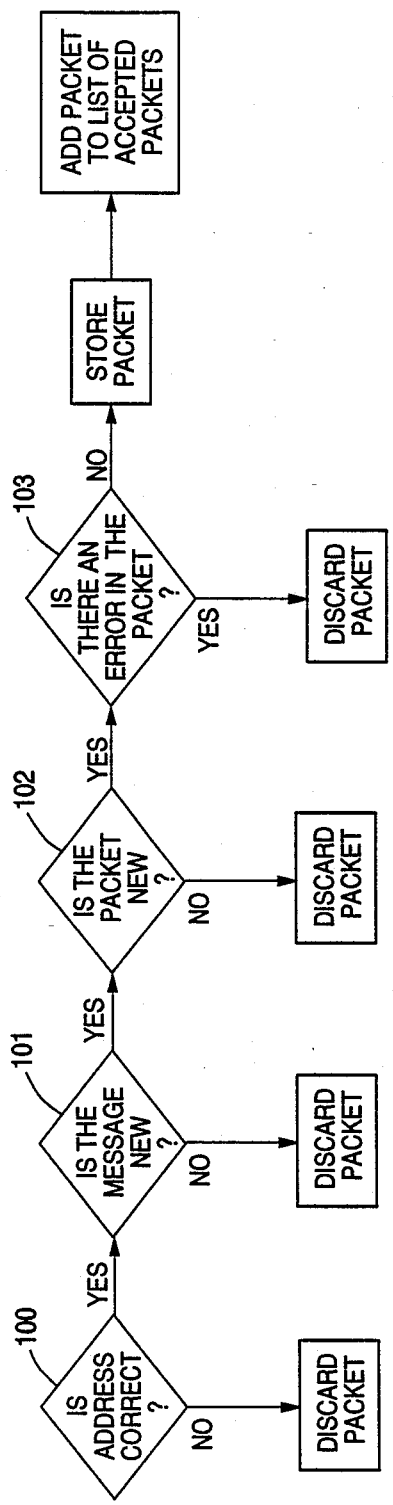
FIG. 3 is a flow chart indicating the signal processing steps performed in accordance with a preferred embodiment of the invention to process a packet received at a receiver, such as one of the receivers in the FIG. 1 system.

FIG. 3 is a flow chart indicating the signal processing steps performed by the computer within each receiver upon receiving a packet. The computer first considers the address within the header of each packet to determine whether or not the packet is intended for a recipient having a mail stop at that receiver. If the recipient address includes that receiver (i.e., if the receiver code R of the header matches a corresponding code stored within the receiver), the receiver functions to capture the packet and to store the captured packet in an internal memory. If the computer determines that the recipient address is not located at the receive including the computer, the receiver will disregard ("discard") the message. In order to ignore false addresses, the receiver will continue to monitor the packet in order to determine the end of the present packet to accurately identify the next header for consideration.

If the packet is captured and stored, then the computer considers the message number in the packet's header to determine whether an entire message having the same message number has already been accurately captured by the receiver. If so, then the receiver recognizes that the packet is part of a superfluous retransmission of the previously received message and will discard the packet. If not (i.e., if no message having the message number has been previously captured), then the computer will examine the packet number within the packet's header (and compare it with a list of previously captured packets) to determine whether a packet having both the message number and the packet number of the packet under consideration has previously been captured by the receiver. If such a packet has been previously captured, then the receiver will discard the packet. If not, the computer will perform an error check (using any conventional error check technique) using the CRC (or other error code) within the packet's header to determine if there are errors in the captured packet. If there is an error, the packet is discarded. If there are no errors, then the packet is allowed to remain stored in the receiver, and the message number and packet number of the packet are added to a list of accurately received packets stored within the computer (or in an external memory coupled to the computer).

Upon retransmission of the same packet, the computer in each receiver will discard the retransmitted packet if the packet is not included in the above-mentioned list of accurately received packets. Preferably, the packet number will include an indication of the total number of packets comprising the message associated therewith. When all packets of a message are added to the list of received packets, then in one embodiment, the associated message number will be added to a message list used to perform the step indicated by block 101 in FIG. 2 (namely, the step of determining whether a packet is part of a message that has previously been entirely and accurately received).

In a variation on the preferred embodiment described with reference to FIGS. 2 and 3, only the first packet of each message includes a header of the type of which two are shown in FIG. 2. The subsequent packets need only include only a packet number (i.e., they need not include the B, R, M, and message number information included in each FIG. 2 header), digitally encoded data, and a CRC code. In this variation, the method steps indicated by blocks 100 and 101 in FIG. 3 are performed only for the first packet within a message. The method steps indicated by blocks 102 and 103 in FIG. 3 are, however, performed for each packet.

Messages may be improperly received because of inadvertent noise signals inherent in the broadcast medium 16 disrupting the transmission. To ensure that each message is completely and correctly received, each message is retransmitted selected number of times. The probability that a given packet in a received, multipacket message will be erroneously received after two or more transmission cycles is lower than the probability that the packet will be erroneously received in just one of the transmission cycles. In areas of relatively noise-free broadcast transmission, we prefer to transmit each message no more than five times. We have found that, in many cases, a message transmission followed by a single retransmission will be sufficient. In a preferred embodiment, a computer in the host unit 12, or in each broadcast station 14, will be programmed so as to permit an operator to set the number of retransmissions for a given message by entering a software instruction into the computer. The number of retransmissions is preferably selected to be the minimum number expected to result in error free reception of the message at the receiver of each intended recipient.

The signal processing steps described herein, such as those described with reference to FIG. 3 (and the variations thereon), and those described in the preceding paragraph, may be performed by a computer using software implementing the described algorithms to operate on digital signals representing the messages, packets, and other information described herein. An ordinarily skilled practitioner in the field to which the invention pertains will be able readily to generate appropriate software for implementing these operations.

Even though the present invention has been disclosed with respect to preferred embodiments, modifications which become apparent to persons skilled in the art after study and review of this Specification may be within the scope of the invention, as claimed below.

What is claimed is:

1. A method for one-way transmission of a digitally encoded message over a broadcast network to a plurality of receivers, including the steps of:

(a) generating a number of packets, each packet including a portion of the digitally encoded message, a header, and an error code, where each header includes a message code identifying the message to which the packet belongs and a packet code identifying the position of the packet within the message;

(b) transmitting the set of packets comprising the message to the receivers;

(c) cyclically retransmitting to the receivers, for a selected number of transmission cycles, the set of packets comprising the message;

(d) at each receiver, comparing the message code and packet code of each received packet with an internally stored list of message codes and packet codes of previously accepted packets, and performing an error check on each packet whose message code and packet code are not included in the list; and (e) storing, as part of the list, the message code and packet code of each packet for which no errors are detected, and storing each said packet for which no errors are detected.

2. The method of claim 1, wherein the packets comprising the message are broadcast to the receivers in the SCA band of an FM channel.

3. The method of claim 1, wherein at least one header of a packet received at the receivers includes an address identifying an intended recipient of the message, and including the step of:

(f) at each receiver, comparing the transmitted address with an internally stored address list including at least one internally stored address before performing step (d), and performing steps (d) and (e) only on those packets identified by a transmitted address matching an internally stored address on the internally stored address list.

4. The method of claim 3, wherein the header of each transmitted packet includes an address identifying an intended recipient of the message, and wherein upon reception of each transmitted packet at one of the receivers, the receiver compares the address of the header of the received packet with said internally stored address list.

5. The method of claim 3, wherein only one packet of the message includes an address identifying an intended recipient of the message, and steps (d) and (e) are performed on each packet included in the message only if one of the received packets comprising the message includes an address which matches an internally stored address on the internally stored address list.

6. The method of claim 1, wherein each error code is a cyclic redundancy check code, and in step (d), each error check operation is performed using the cyclic redundancy check code for the packet being checked.

7. The method of claim 1, wherein the number of transmission cycles is selected to be the minimum number expected to result in error free reception of the message at the receiver of each intended recipient.

8. The method of claim 1, wherein the number of transmission cycles is selected to be a number in the range from two through five.

9. A method for one-way transmission of a digitally encoded message over a broadcast network to a plurality of receivers, including the steps of:

(a) generating a number of packets, each packet including a header, a cyclic redundancy check code, and a portion of the digitally encoded message between the header and the error code, where each header includes a message code identifying the message to which the packet belongs and a packet code identifying the position of the packet within the message;

(b) transmitting the set of packets comprising the message to the receivers;

(c) cyclically retransmitting to the receivers, for a selected number of transmission cycles, the set of packets comprising the message;

(d) at each receiver, and for each packet transmitted to said each receiver, comparing the message code and packet code of the received packet with an internally stored list of message codes and packet codes of previously accepted packets, using the packet's cyclic redundancy check code to perform an error check on the packet unless the message code and packet code of the packet are included in the list, and disregarding the packet if the message code and packet code of the packet are not included in the list; and (e) storing, as part of the list of message codes and packet codes, the message code and packet code of each packet for which the error check operation indicates no errors.

10. The method of claim 9, also including the step of storing each said packet for which the error check operation indicates no errors.

11. The method of claim 9, wherein the packets comprising the message are broadcast to the receivers in the SCA band of an FM channel.

12. The method of claim 9, wherein at least one header includes an address identifying an intended recipient of the message, and including the step of:

(f) at each receiver, and for each packet transmitted to the receiver, comparing the transmitted address with an internally stored address list including at least one internally stored address before performing step (d), and performing steps (d) and (e) only on those packets identified by a transmitted address matching an internally stored address on the internally stored address list.

13. The method of claim 12, wherein each header includes an address identifying an intended recipient of the message, and the address of each header is compared with said internally stored address list.

14. The method of claim 12, wherein only one packet of the message includes an address identifying an intended recipient of the message, and steps (d) and (e) are performed on each packet included in the message only if a packet comprising the message includes an address which matches an internally stored address on the internally stored address list.

15. The method of claim 9, wherein the number of transmission cycles is selected to be the minimum number expected to result in error free reception of the message at the receiver of each intended recipient.

16. The method of claim 9, wherein the number of transmission cycles is selected to be a number in the range from two through five.

* * * * *